United States Patent
Powell et al.

(10) Patent No.: US 10,102,953 B2
(45) Date of Patent: Oct. 16, 2018

(54) APPARATUS AND METHODS FOR MAGNET RETENTION

(71) Applicant: MAGNOMATICS LIMITED, Sheffield (GB)

(72) Inventors: David James Powell, Sheffield (GB); Jeffrey George Birchall, Sheffield (GB)

(73) Assignee: Magnomatics Limited (GB)

( * ) Notice: Subject to any disclaimer, the term of this patent is extended or adjusted under 35 U.S.C. 154(b) by 261 days.

(21) Appl. No.: 14/772,516

(22) PCT Filed: Mar. 10, 2014

(86) PCT No.: PCT/GB2014/050709
§ 371 (c)(1),
(2) Date: Sep. 3, 2015

(87) PCT Pub. No.: WO2014/135902
PCT Pub. Date: Sep. 12, 2014

(65) Prior Publication Data
US 2016/0020008 A1      Jan. 21, 2016

(30) Foreign Application Priority Data
Mar. 8, 2013   (GB) .................................. 1304258.5

(51) Int. Cl.
*H02K 1/28* (2006.01)
*H02K 1/30* (2006.01)
(Continued)

(52) U.S. Cl.
CPC .......... *H01F 7/0221* (2013.01); *H01F 7/021* (2013.01); *H01F 7/0252* (2013.01);
(Continued)

(58) Field of Classification Search
CPC .................................. H02K 1/28; H02K 1/30
(Continued)

(56) References Cited

U.S. PATENT DOCUMENTS 5,691,589 A * 11/1997 Keim .................... H02K 1/2786
29/596
5,831,364 A * 11/1998 Buse ...................... H02K 1/278
310/104
(Continued)

FOREIGN PATENT DOCUMENTS

EP      0212552 A1      8/1986
EP      2346144 A1      7/2011
(Continued)

OTHER PUBLICATIONS

Search Report, GB1304258.5, dated Jul. 19, 2013, 2 pages.
Search Report, PCT/GB2014/050709, dated May 27, 2014, 6 pages.

*Primary Examiner* — Jeremy Luks
(74) *Attorney, Agent, or Firm* — Dorsey & Whitney LLP

(57) ABSTRACT

An apparatus and method for holding permanent magnet components, particularly on a rotor of an electrical machine. A magnet carrier (10) comprises a channel (30) suitable for receiving an encircling magnet retainer (20) and a method of manufacturing a magnet assembly (100) comprises providing a magnet carrier (10) comprising a channel (30), mounting a magnet (60) on the magnet carrier (10), and encircling the magnet (60) and magnet carrier (10) with a magnet retainer (20), wherein the magnet retainer (20) passes through the channel (30).

18 Claims, 5 Drawing Sheets

(51) Int. Cl.
  *H01F 7/02* (2006.01)
  *H02K 1/27* (2006.01)
  *H02K 15/03* (2006.01)
  *H01F 13/00* (2006.01)
  *H01F 41/02* (2006.01)
  *H02K 7/18* (2006.01)

(52) U.S. Cl.
  CPC ....... *H01F 13/003* (2013.01); *H01F 41/0253* (2013.01); *H02K 1/278* (2013.01); *H02K 1/2713* (2013.01); *H02K 1/2786* (2013.01); *H02K 1/2793* (2013.01); *H02K 15/03* (2013.01); *H02K 7/1838* (2013.01)

(58) Field of Classification Search
  USPC ............ 310/156.08, 156.12, 156.13, 156.28, 310/156.29, 156.31
  See application file for complete search history.

(56) References Cited

U.S. PATENT DOCUMENTS

| | | | |
|---|---|---|---|
| 7,030,530 B2 * | 4/2006 | Malmberg | H02K 1/278 310/154.01 |
| 2003/0193254 A1 * | 10/2003 | Morimatsu | H02K 1/2786 310/156.08 |
| 2006/0138890 A1 | 6/2006 | Kato | |
| 2006/0290218 A1 * | 12/2006 | Shafer | H02K 1/278 310/156.28 |
| 2007/0290564 A1 * | 12/2007 | Clark | H02K 1/278 310/156.29 |
| 2009/0072639 A1 | 3/2009 | Seneff et al. | |
| 2009/0167103 A1 * | 7/2009 | Jansen | H02K 1/278 310/156.48 |
| 2012/0019088 A1 * | 1/2012 | Stiesdal | H02K 1/28 310/156.12 |
| 2012/0248916 A1 * | 10/2012 | Clark | H02K 1/278 310/156.12 |
| 2014/0042868 A1 * | 2/2014 | Sullivan | H02K 1/278 310/261.1 |

FOREIGN PATENT DOCUMENTS

| | | |
|---|---|---|
| EP | 2410633 A1 | 1/2012 |
| GB | 2438443 A | 11/2007 |
| WO | WO 2009/068736 A1 | 4/2009 |
| WO | WO 2012/031923 A1 | 3/2012 |

\* cited by examiner

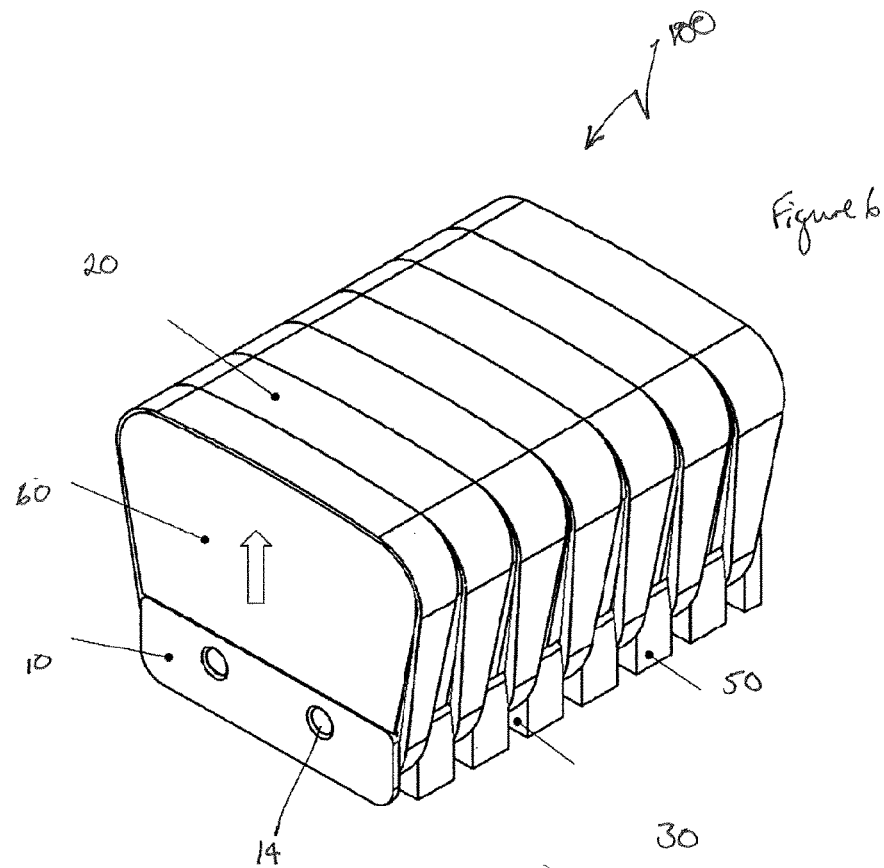
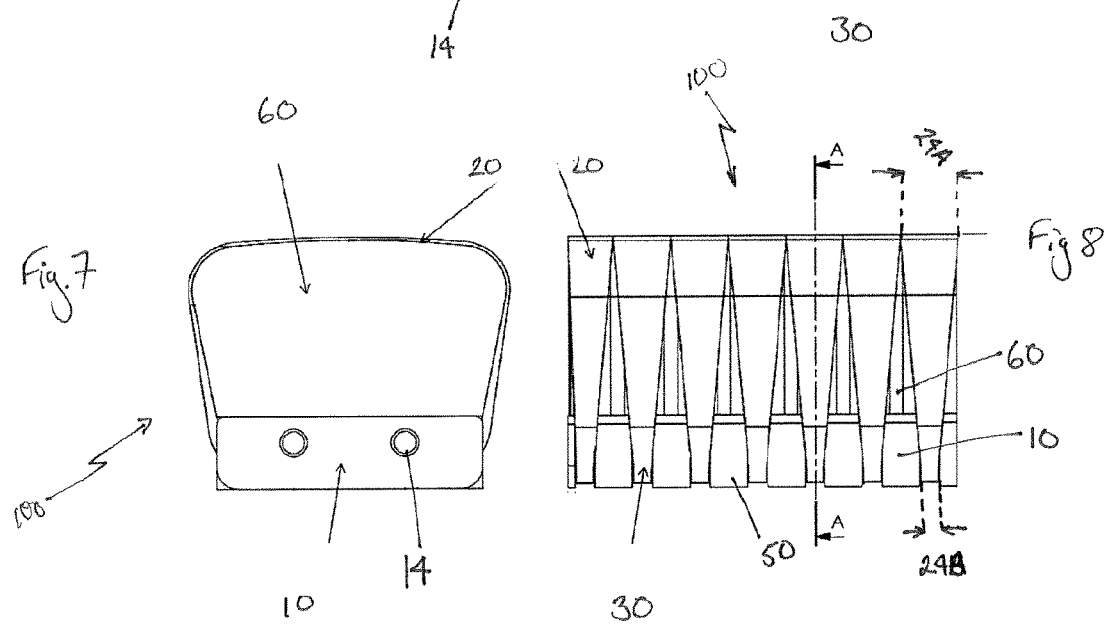

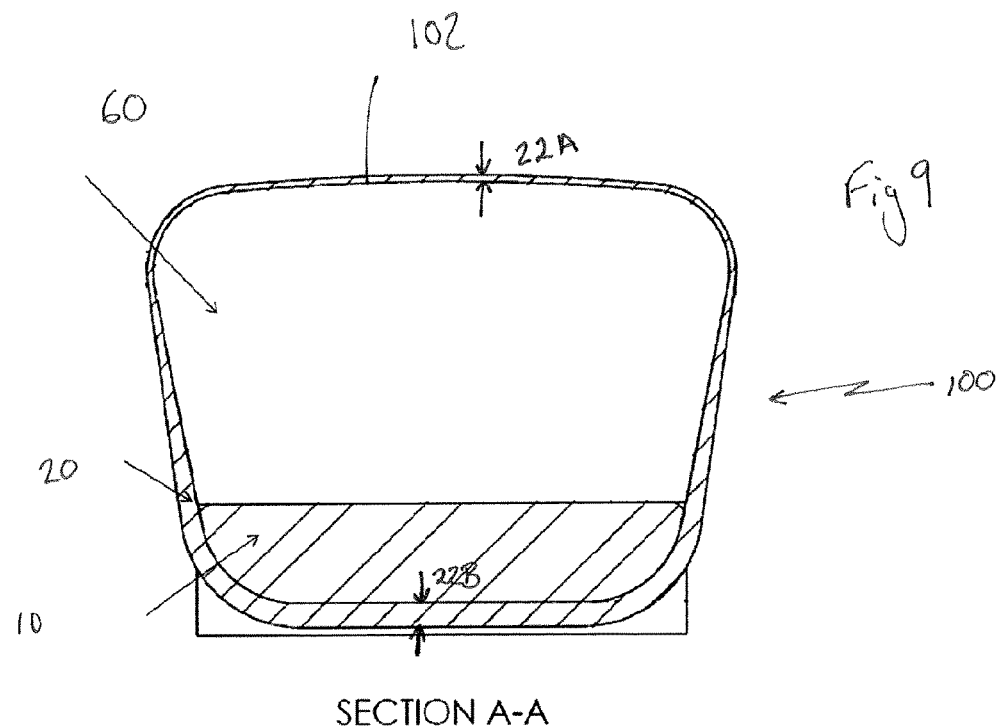
SECTION A-A
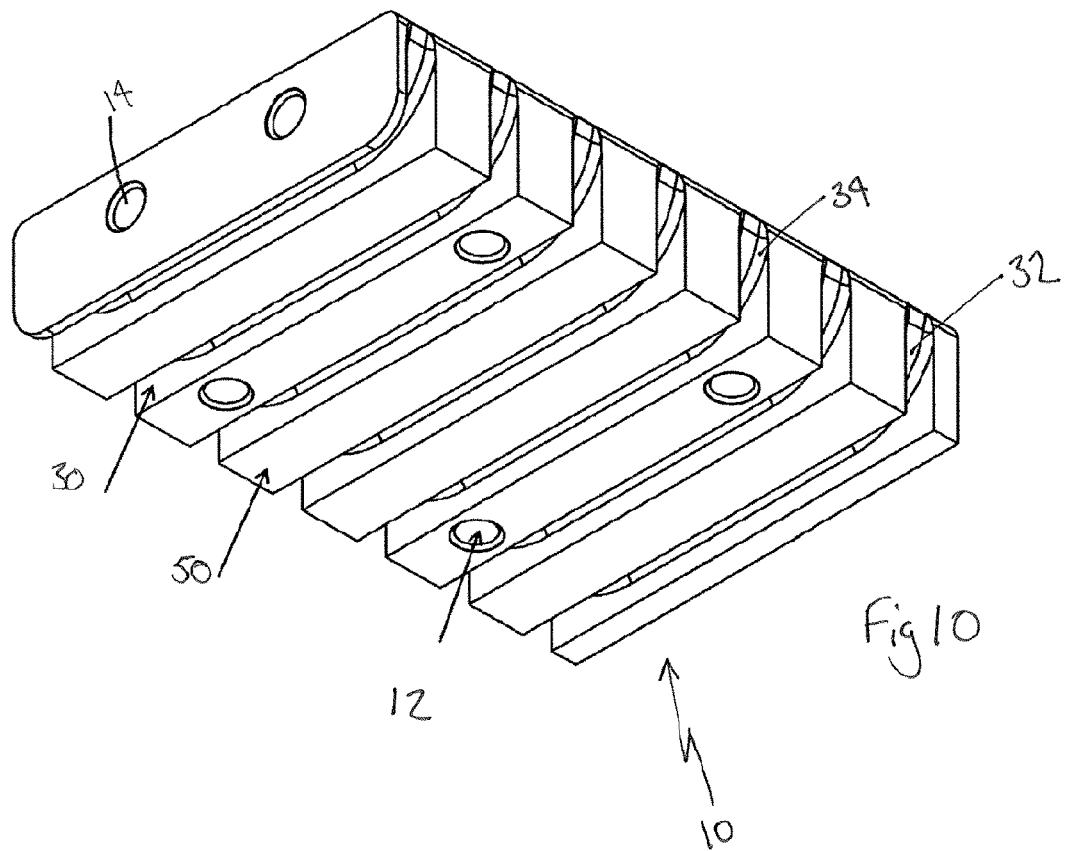

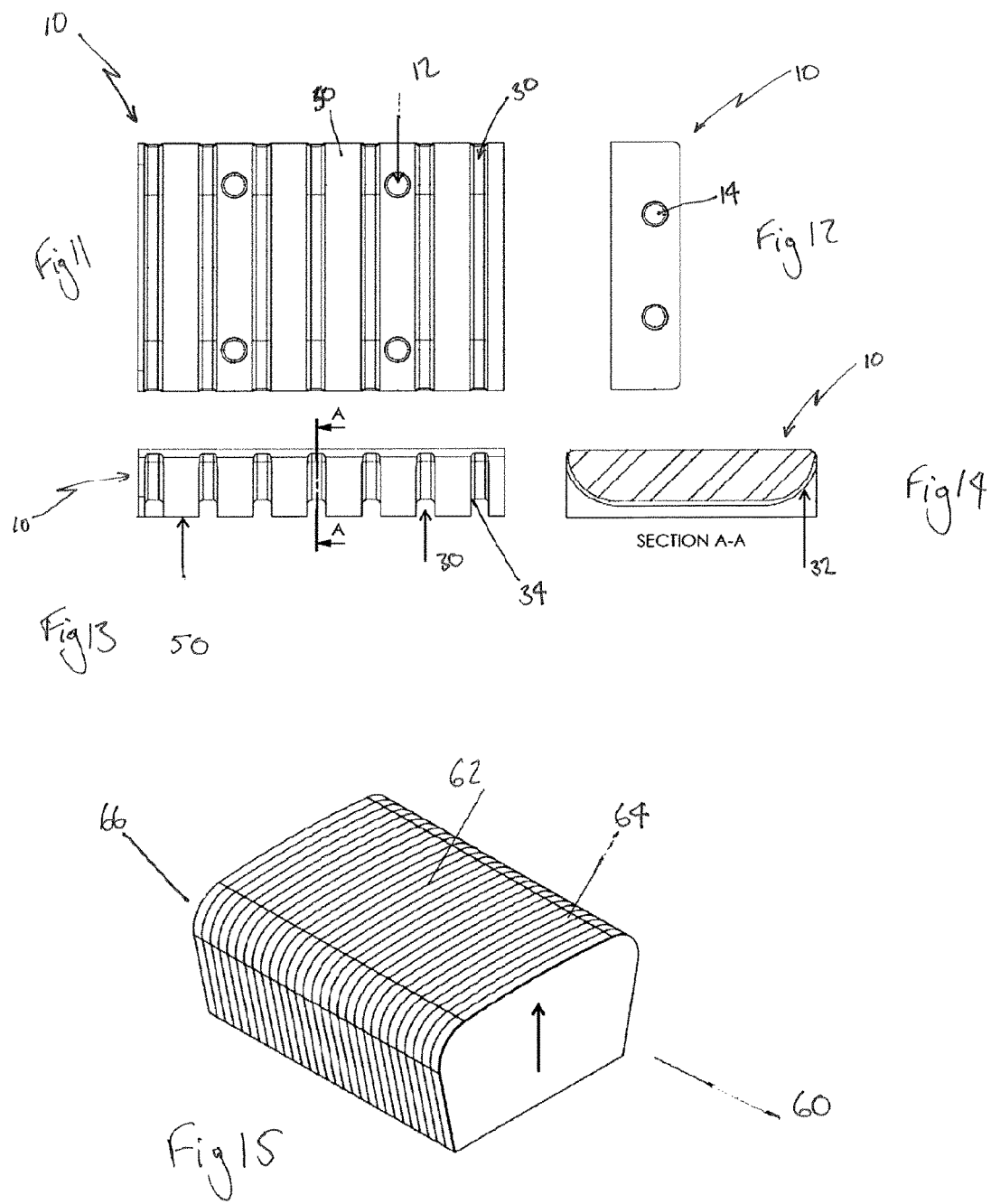

APPARATUS AND METHODS FOR MAGNET RETENTION

CROSS-REFERENCE TO RELATED APPLICATIONS

This application is a national stage application of International Application No. PCT/GB2014/050709, filed Mar. 10, 2014, and entitled "APPARATUS AND METHODS FOR MAGNET RETENTION", which claims priority to GB Application No. 1304258.5 filed Mar. 8, 2013, and entitled "APPARATUS AND METHODS FOR MAGNET RETENTION", both of which are hereby incorporated by reference herein in their entireties for all purposes.

FIELD OF THE INVENTION

The present invention relates to an apparatus and method for magnet retention, in particular magnet retention for use with a permanent magnet rotor, such as for an electrical machine.

BACKGROUND

Permanent magnet rotors have various applications in electrical machines, including use in a permanent magnet motor as shown in FIG. 1. Permanent magnet rotors, especially those with surface mounted magnets, often require additional mechanical means for retaining the magnets on the rotor hub. In particular, at high speeds, the magnets are subject to high centrifugal forces and it is not possible to rely on adhesive bonding of the magnet to the rotor hub surface alone.

Relying on adhesive bonding on the contact surface between magnet and rotor back-iron also requires the magnet material to have sufficient strength under tension throughout its structure to prevent failure under centrifugal loads. The physical properties of sintered magnets typically used in high performance motors (e.g. neodymium iron boron NdFeB) can vary from batch to batch in production. Without resorting to X-ray inspection techniques, there is no way of identifying voids and potential crack propagation points in the material, and thus the quoted typical material properties cannot be relied upon. A suitable containment that acts to contain the magnets should they fracture in any way and prevents them from going in to tension (thus reducing the likelihood of fracture) is therefore often required. The containment must also prevent significant displacement of the magnets that would cause the rotor to become unbalanced.

Retention of the magnet blocks can also be complicated by the requirement for segmented magnets. Typical magnet materials (e.g. sintered NdFeB) are also electrically conductive. Due to armature reaction and changes in the magnet working point as it rotates past the toothed structure of the machine stator, eddy currents are induced in the material leading to losses which reduce efficiency and lead to self-heating of the magnet material which can lead to a reduction in flux density and hence machine performance due to the temperature sensitive nature of the magnet material. Therefore the magnets are often laminated or segmented in order to impede the flow of eddy currents, usually with insulating bond planes between magnet segments. This can also reduce the mechanical strength of the magnet block.

Typically, smaller rotors may have a composite sleeve placed over the magnets, as shown in FIG. 2, usually manufactured from a carbon fibre or glass fibre wound within an epoxy matrix. This may be "wet-wound" directly onto the magnet rotor and then cured. Alternatively, a tube may be pre-formed on a mandrel and fitted over the rotor. It is often desirable to achieve a pre-stress in the hoop direction of the fibres which minimises any movement of the magnets should they become dis-bonded. In the case of wet-wound rotors, this is achieved by winding the fibres under tension. For a pre-formed tube, the pre-stress may be achieved by using a thermal interference fit (e.g. rotor cooled before being dropped into a sleeve at room temperature). The outer surface of the overwrap sleeve may then be ground to achieve a high tolerance part compatible with the small airgap/clearances required in motors.

Although larger diameter machines (used in marine propulsion or wind turbines for example) often run at low to medium speeds, the combination of large diameter and speed and/or use of relatively large magnetic blocks can lead to high centrifugal forces on the magnets. However, the method of overwrapping the complete rotor with a sleeve is problematic on large diameter rotors. The pre-tension requirements to overcome the strain in the carbon-fibre under loading and maintain negligible displacement in the magnets preclude its use as the overwrap thickness required would lead to poor electromagnetic performance due to the increased magnetic airgap.

The present invention provides a method and apparatus for mounting magnets which has potential benefits in terms of ease of manufacture and mechanical strength while minimising the thickness of the retention system to ensure the magnetic airgap is minimised. It is particularly relevant to large diameter machines and high-speed applications where the centrifugal forces are significant and/or in applications with larger magnet poles.

SUMMARY OF THE INVENTION

In accordance with the present invention, there is provided a magnet carrier comprising a channel suitable for receiving an encircling magnet retainer.

The magnet carrier may preferably be made of ferromagnetic material, most preferably steel. The floor of the channel may be chamfered and/or rounded and the channel may have a chamfered and/or rounded profile. The magnet carrier may comprise a plurality of channels suitable for receiving an encircling magnet retainer. The magnet carrier may further comprise mounting means suitable for mounting the magnet carrier to a rotor rim. The mounting means may comprise at least one tapped hole.

There is further provided a magnet assembly comprising a magnet carrier comprising a channel suitable for receiving an encircling magnet retainer; a permanent magnet; and a magnet retainer which encircles the carrier and the permanent magnet, wherein the magnet retainer passes through the channel.

The magnet retainer may comprise fibre filament. The fibre filament may be carbon fibre or glass fibre. The magnet retainer may further comprise an epoxy. The magnet retainer may be under tension.

The magnet retainer may be thinner on a face of the magnet than it is in the channel. The magnet retainer may cover a greater surface area of a face of the magnet than it covers of the base of the magnet carrier. The magnet retainer may have a greater width on a face of the magnet than the width of the channel.

The magnet may be a laminated magnet or a segmented magnet. The magnet may have at least one chamfered and/or rounded edge.

There is further provided a permanent magnet rotor comprising a plurality of magnet assemblies comprising a magnet carrier comprising a channel suitable for receiving an encircling magnet retainer; a permanent magnet; and a magnet retainer which encircles the carrier and the permanent magnet, wherein the magnet retainer passes through the channel.

The plurality of magnet assemblies may be coupled to a rotor rim. The rotor rim may be ferromagnetic. The channel may lie in a circumferential or an axial direction of the rotor.

There is further provided a method of manufacturing a magnet assembly comprising providing a magnet carrier comprising a channel; mounting permanent magnet material on the magnet carrier; and encircling the permanent magnet material and magnet carrier with a magnet retainer, wherein the magnet retainer passes through the channel.

The permanent magnet material may be unmagnetized when mounted to the magnet carrier. The permanent magnet material may be magnetized after it has been mounted on the magnet carrier. The permanent magnet material may be magnetized to create a permanent magnet after the permanent magnet material and magnet carrier have been encircled with the magnet retainer.

The magnet retainer may comprise fibre filament. The magnet retainer may comprise carbon fibre. The magnet retainer may comprise glass fibre. The magnet retainer may further comprise an epoxy. The step of encircling the magnet and magnet carrier may comprise winding the fibre around the magnet and magnet carrier. The fibre may be wound under tension.

The step of mounting permanent magnet material on the magnet carrier may include bonding the permanent magnet material to the magnet carrier using adhesive. The adhesive may be an epoxy. The adhesive may be an acrylic.

There is further provided a method of manufacturing a permanent magnet rotor comprising manufacturing, in one of the ways discussed above, at least one magnet assembly; and mounting the at least one magnet assembly on a rotor rim.

Mounting the at least one magnet assembly on a rotor rim may comprise loading the magnet assembly onto tooling or guideways; and guiding the magnet assembly onto the rotor rim using the tooling or guideways.

BRIEF DESCRIPTION OF THE DRAWINGS

Embodiments of the present invention will now be described in detail by way of example with reference to the following figures in which:

FIG. 6 shows a perspective view of a magnet assembly in accordance with an aspect of the present invention;

FIG. 7 shows an end view of the magnet assembly of FIG. 6;

FIG. 8 shows a side view of the magnet assembly of FIG. 6;

FIG. 9 shows a cross-sectional view of the magnet assembly of FIG. 6, taken along section A-A in FIG. 8;

FIG. 10 shows a perspective view of a magnet carrier in accordance with an aspect of the present invention;

FIG. 11 shows a bottom view of the magnet carrier of FIG. 10;

FIG. 12 shows an end view of the magnet carrier of FIG. 10;

FIG. 13 shows a side view of the magnet carrier of FIG. 10;

FIG. 14 shows a cross-sectional view of the magnet carrier of FIG. 10, taken along section A-A in FIG. 12;

FIG. 15 shows a perspective view of a segmented permanent magnet.

DETAILED DESCRIPTION

Figure 3:
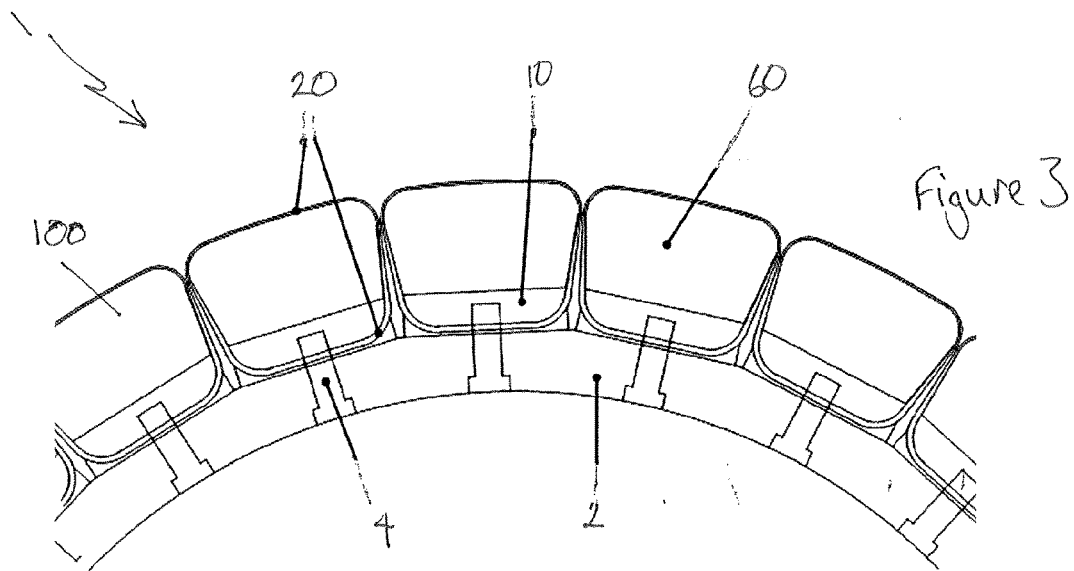
FIG. 3 shows a permanent magnet rotor in accordance with an aspect of the present invention.

FIG. 3 shows a section of a permanent magnet rotor 1 in accordance with an embodiment of the present invention. As may be seen in FIG. 3, magnet assemblies 100, each comprising a magnet carrier 10, a permanent magnet 60, and a magnet retainer 20, are mechanically fixed to a rotor rim 2. The magnet assemblies 100 may be fixed to the rotor rim 2 by any suitable means; in the embodiment shown the magnet assemblies are fixed to the rotor rim 2 using bolts 4.

Figure 4:
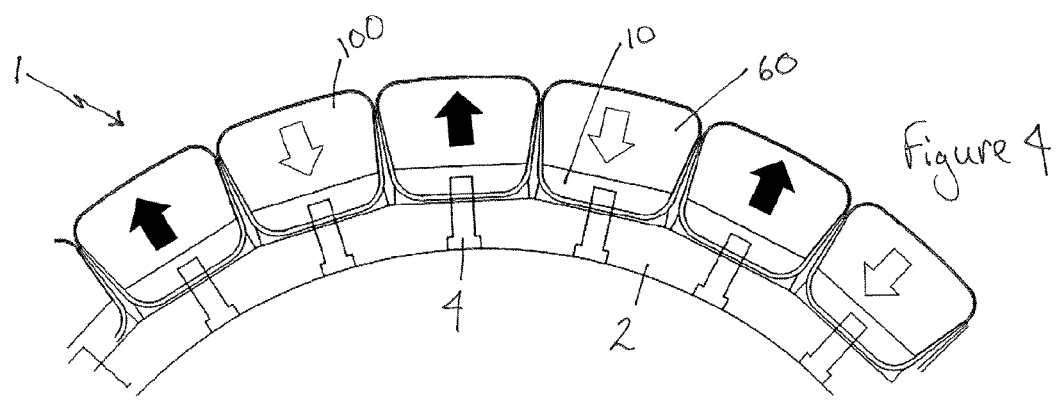
FIG. 4 shows a permanent magnet rotor in accordance with an aspect of the present invention.
Figure 5:
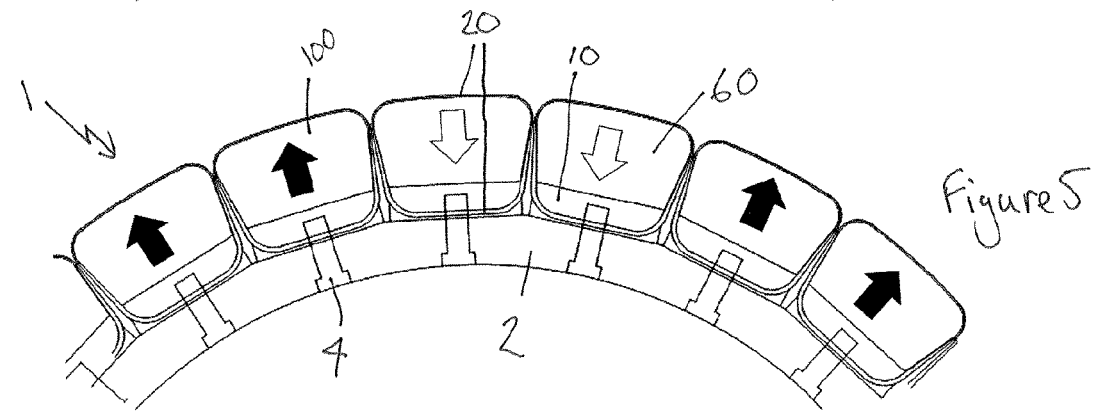
FIG. 5 shows a permanent magnet rotor in accordance with an aspect of the present invention.

The magnets 60 in the magnet assemblies 100 may be alternately magnetized in "radial in" and "radial out" directions (which may be considered as alternate North and South magnets) as shown in FIG. 4. Alternatively, wider poles may be achieved by using two or more poles of the same polarity as shown in FIG. 5.

FIGS. 6-9 show an embodiment of a magnet assembly 100. A permanent magnet 60 is mounted to a magnet carrier 10 by means of a magnet retainer 20. The magnet retainer 20 encircles the magnet 60 and magnet carrier 10, passing through a plurality of channels 30 formed in the base of the magnet carrier 10. In some embodiments, more than one permanent magnet 60 may be mounted on a single magnet carrier 10.

In a preferred embodiment, the magnet carrier 10 is formed of a ferromagnetic material, most preferably magnetic steel. Suitable steels may include Mild Steel (Grades such as 1020, 1020, EN1a), Silicon Steel (Carpenter Silicon-C), Ferritic and Martensitic Stainless Steel (i.e. Grades 410, 416, 446) or Cobalt Iron alloys. The magnet carrier 10 may serve as a mechanical interface to a rotor rim 2, as shown in FIG. 3. The rotor rim 2 may be formed of a ferromagnetic material. Where the magnet carrier and rotor rim 2 are ferromagnetic, the magnet carrier 10 together with the rotor rim 2 may provide back iron for the electromagnetic circuit (e.g. return path for the magnetic flux between adjacent magnet poles).

Preferably, the electromagnetic path should not be compromised in the rotor back iron. The magnet carrier 10 provides slots or channels 30 for the magnet retainer 20 to pass under the magnet assembly 100. The intermediate projections or teeth 50 between the channels 30 allow the magnet flux to pass unimpeded (e.g. without creating a large airgap with high reluctance) from the magnet carrier 10 into the further ferromagnetic structure or rotor rim 2 which makes up the remainder of the rotor back iron. The teeth 50 of the magnet carrier 10 preferably provide sufficient cross-sectional area for the magnetic flux path. In a preferred embodiment, the magnet carrier is made of steel. Due to the higher saturation flux density of steel (typically 1.5-2.0T) the cross-sectional area of the steel within the flux path can be less than the cross-sectional area of the magnet 60 which typically would have a working flux density of 0.8-1.0T without there being any issues of magnetic saturation leading to high reluctance in the magnetic circuit and a reduction in magnetic performance.

The magnet retainer 20 may preferably comprise a fibre filament wound in an epoxy matrix. Suitable fibre filaments include carbon fibre and glass fibre. Preferably, the fibre may be wound with a certain tension (preferably about 5-10 kg force, or about 49-98 N) applied to a tow to achieve a pre-stress in the finished cured part. The choice of fibre (e.g. carbon or glass) and epoxy matrix will depend on the required strength and also potentially any restrictions on cure cycle due to temperature limits of the magnet material. The fibres may be wet wound (i.e. dry fibres are run through a resin bath before being wound around the magnet and magnet carrier) or may be a pre-impregnated product or "pre-preg" which has an epoxy coating applied. Baking of the component in an oven or autoclave then cures the epoxy. A mould may be applied over the component during the curing process to ensure a final shape/surface finish of the epoxy. Preferably a tow may comprise between 3,000 and 15,000 carbon fibre filaments, most preferably 7,000. Preferably, the diameter of each carbon fibre may be between about 5 and 10 micrometers, most preferably 6 micrometers.

The magnet retainer may preferably be added to the magnet and magnet carrier using a resin transfer mould process (RTM) in which the magnet and magnet carrier are dry wrapped with layers of carbon or glass fibre (which may be, for instance, in the form of matting, tape or strands) and then clamped and held in a mould cavity while low viscosity resin or epoxy is injected under pressure. The component is then cured with heat as described above to produce a highly integral part.

The magnet retainer 20 may be subtended at an angle to cover a large area of the surface of the magnets 60 on the upper face 102. Therefore, the width 24A of the magnet retainer 20 on the upper face 102 may be larger than the width 24B of the channel 30 on the magnet carrier 10. In the case of the magnet retainer 20 comprising a fibre filament wound under tension, a force will be exerted by the magnet retainer 20 along the fibre direction. However, the maximum angle (θ) between an angled fibre and a zero-degree wrapped fibre (perpendicular to the axial direction) is preferably small. Therefore, the resolved force from the magnet retainer 20 along the axial direction, which is proportional to sin(θ), may be negligible.

The aspect ratio of the cross section of the magnet retainer 10 may vary around the magnet assembly 100. The magnet retainer 20 may form a thin layer (of thickness 22A) on the upper face 102 of the magnet assembly 100 which may be adjacent to the electrical machine airgap (e.g. facing the stator in a conventional radial field permanent magnet machine) in use. The magnet retainer 20 may be comparatively thicker (thickness 22B) in the channel 30. The magnet retainer 20 may have a constant cross-sectional area. A thin magnet retainer 20 on the upper face 102 has the advantage of minimising the magnetic airgap in a machine employing the rotor.

FIGS. 8-12 show the magnet carrier 10 in more detail.

Figure 1:
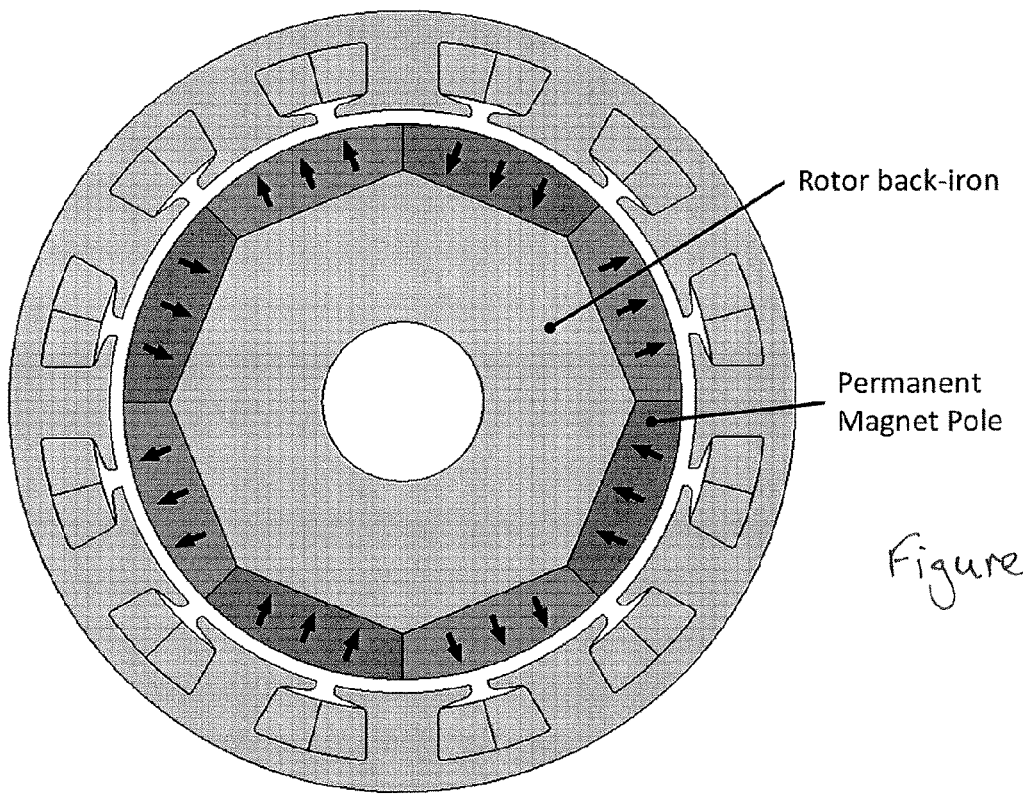
FIG. 1 shows a cross-sectional view of a permanent magnet motor.
Figure 2:
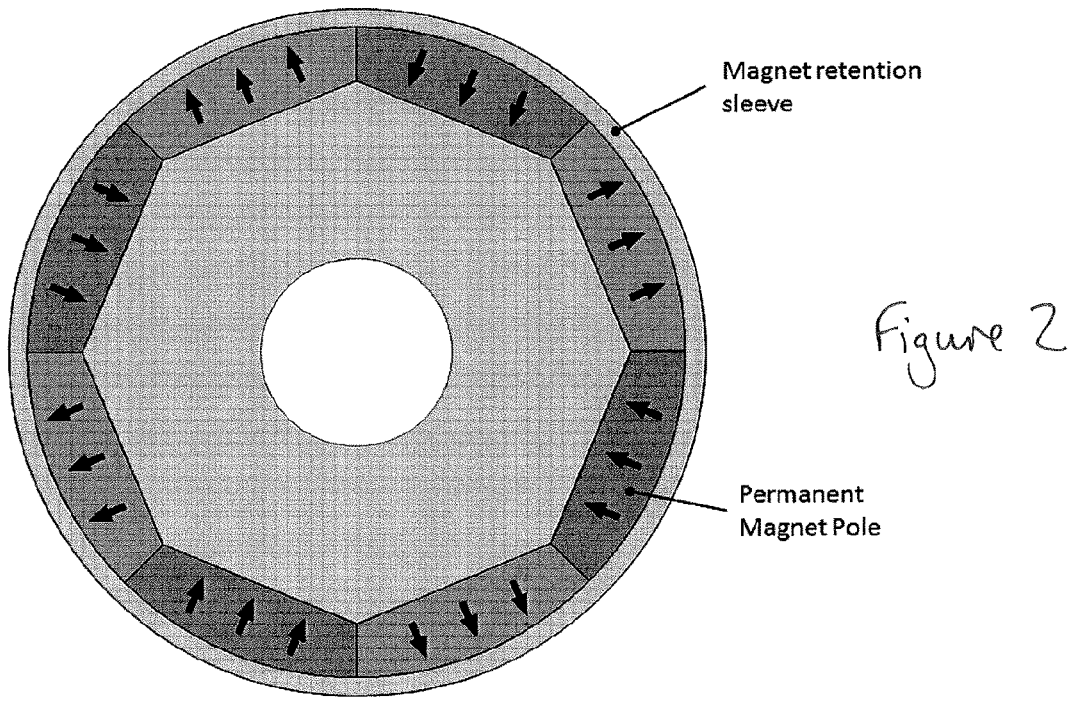
FIG. 2 shows a known permanent magnet rotor.

The magnet carrier 10 may also comprise a number of mechanical fixing points 12 to allow the carrier to be mounted onto the rotor structure as shown in FIG. 1. The mechanical fixing points 12 may be tapped holes. In the embodiment shown in FIG. 1, bolts 4 pass through clearance holes in the rotor rim 1, and engage in the magnet carrier mechanical fixing points 12. Additional fixing points 14 may also be included on other faces of the carrier that allow the magnet assembly to be securely held against magnetic forces as the magnets are mounted on to the rotor. Of course, the clearance and tapped holes may be located oppositely to the above, and alternative mechanisms for fixing may be employed instead.

Preferably, the channels 30 have profiled edges 32, which may be, for example, chamfered and/or rounded. Profiled edges 32 help avoid high stress concentrations in the magnet retainer 20. Where the magnet retainer 20 comprises fibre filament, profiled edges also allow the fibre to pass around the structure without sharp corners causing breakage of the fibre tow as it is wound. Preferably the profiled edge has a radius that is larger than minimum bend radius of the fibre. It is also advantageous to have chamfers or radii on the leading edges 34 of the channels 30 to prevent the fibre tow snagging during winding and allowing it to pass into the channel 30 without breakages.

FIG. 15 shows a permanent magnet 60 suitable for use with the magnet carrier 10. The magnet 60 is segmented to avoid eddy currents, with bonded interfaces 62 between segments 64. In an embodiment, the bonded interfaces 62 preferably comprise glass beads to prevent contact between segments 64. Similarly to the magnet carrier channels 30 the magnet 60 may have profiled edges 66 to prevent stress concentrations and, in the case of a magnet retainer comprising fibre filament, reduce the bend radius of the fibre during winding. The removal of material in this region does not have significant impact on machine performance (e.g. airgap flux density and torque production) as the magnet material here usually contributes to inter-pole leakage (i.e. flux that leaks between magnet poles on the rotor without crossing the airgap and linking with the rest of the electrical machine).

In the embodiment described above the magnet retainer 20 lies in the circumferential direction of the rotor. It is also possible that the magnet retainer 20 and hence channels 30 run axially along the magnet 60 and magnet carrier 10, i.e. the magnet retainer may run parallel to the axis of rotation of the rotor. However, if the relevant edges of the magnet are profiled to remove sharp corners, this arrangement may increase the effective airgap on the main axis of the magnetic pole and can be detrimental to performance. In the circumferential case the profiled edge 66 occurs in the magnet inter-pole and loss of magnet material in this location has a significantly lower effect on performance.

To manufacture a magnet assembly 100 such as described above, permanent magnet material is mounted on the magnet carrier 10 and the magnet retainer 20 is encircled around the magnet carrier 10 and permanent magnet material, passing through a channel 30 of the magnet carrier 10.

When the permanent magnet material is mounted on the magnet carrier 10, it may be bonded onto the magnet carrier 10 using a suitable adhesive, such as an epoxy or acrylic.

The adhesive may hold the permanent magnet material in place on the magnet carrier while the magnet retainer 20 is applied. The adhesive may also contribute to retaining permanent magnet 60 during use of magnet assembly 100 on a rotor rim 2.

The permanent magnet material may be mounted on the magnet carrier 10 in an unmagnetized state which simplifies the manufacturing process as high magnetic attractive forces between the permanent magnet material and magnet carrier 10 (which may squeeze out an adhesive) are not present and allows the optimum bondline to be achieved and handling of the permanent magnet material is far easier. The permanent magnet material may then be magnetized to create a permanent magnet 60 after the permanent magnet material has been mounted on the magnet carrier 10, or after the magnet retainer 20 has been applied. Alternatively, the permanent magnet material may be already magnetized to form permanent magnet 60 before mounting on magnet carrier 10.

The permanent magnet 60 may comprise a segmented or laminated magnet. In some embodiments, more than one permanent magnet 60 may be mounted on a single magnet carrier 10.

Preferably, the magnet retainer 20 comprises a fibre filament. Typically the magnet retainer 20 would be formed with a single tow (or bunch of fibres) being wrapped around as the combined magnet 60 and magnet carrier 10 is rotated. The combined magnet 60 and magnet carrier 10, and the fibre tow may also be moved laterally relative to each other in the direction of the axis of rotation to allow the fibre to traverse the length of the magnet 60 and magnet carrier 10. Alternative traversing patterns can be employed such as winding a number of turns in each channel 30 before indexing to the next channel 30 or placing single or low number of turns in a channel 30 before moving to the next and using multiple traverses of the magnet 60 length.

Preferably, the fibre is wound with a certain tension applied to the tow to achieve a pre-stress in the finished cured part. The choice of fibre (carbon or glass) and epoxy matrix will depend on the required strength and also potentially any restrictions on cure cycle due to temperature limits of the magnet material.

To construct a permanent magnet rotor, a plurality of magnet assemblies 100 as described above may be mounted on a rotor rim 2, as shown in FIG. 3.

To facilitate the mounting of the magnet assemblies 100, holes or fixings which aid the mechanical handling of the magnet assembly 100 may be included in the magnet carrier 10. Sintered magnets are brittle and are difficult to machine and, therefore, fasteners or fixings cannot be directly applied to the magnet 60. The ability to mechanically hold the magnet carrier 10 may be exploited to control the forces acting on the magnets 60 during the assembly of the rotor 1.

As a magnet 60 is loaded onto a rotor rim 2, it is subject to a range of forces as it interacts with neighbouring magnets and a possibly ferromagnetic rotor rim 1, which can make manual loading of magnets onto a rotor very challenging. However, the magnet assembly 100 may be loaded onto tooling/guideways and controlled forces applied to lower or guide the magnet assembly 100 onto the rotor rim 2. Once in place, the magnet carrier is fixed to the rotor rim 1 (e.g. using bolts 4 through clearance holes in the rim 1 into mechanical fixing points 12 (e.g tapped holes) in the base of the magnet carrier 10). The tooling fixings may then be released and the rotor indexed round to the next position for the subsequent magnet assembly to be loaded.

To complete assembly of the rotor 1, magnet assemblies 100 may be mounted on the rotor rim 2 around the full circumference of the rotor 1. The magnets 60 in the magnet assemblies 100 may be alternately magnetized in "radial in" and "radial out" directions (which may be considered as alternate North and South magnets) as shown in FIG. 4. Alternatively, wider poles may be achieved by using two or more poles of the same polarity as shown in FIG. 5.

It will of course be understood that the present invention has been described above purely by way of example and modifications of detail can be made within the scope of the invention.

The invention claimed is:

1. A permanent magnet rotor comprising a plurality of magnet assemblies, each magnet assembly comprising:
    a magnet carrier comprising a channel formed in a radially inner surface of the magnet carrier, the channel having two sides and being suitable for receiving an encircling magnet retainer;
    a permanent magnet mounted on a radially outer surface of the magnet carrier; and
    a magnet retainer which encircles the carrier and the permanent magnet, wherein the magnet retainer passes through the channel such that the permanent magnet is retained on the magnet carrier.

2. The permanent magnet rotor of claim 1 wherein the magnet carrier is made of ferromagnetic material.

3. The permanent magnet rotor of claim 1 wherein a floor of the channel is chamfered, rounded, or both.

4. The permanent magnet rotor of claim 1 comprising a plurality of channels suitable for receiving an encircling magnet retainer.

5. The permanent magnet rotor of claim 1 wherein the magnet retainer comprises fibre filament.

6. The permanent magnet rotor of claim 5 wherein the magnet retainer further comprises an epoxy.

7. The permanent magnet rotor of claim 1 wherein the magnet retainer is thinner on a face of the magnet than it is in the channel.

8. The permanent magnet rotor of claim 1 wherein the channel has a width, and the magnet retainer has a greater width on a face of the magnet than the width of the channel.

9. The permanent magnet rotor of claim 1 herein the magnet is a laminated magnet.

10. The permanent magnet rotor of claim 1 wherein the radially inner surfaces of the magnet carriers are in contact with a ferromagnetic rim of the permanent magnet rotor and wherein the channels are sized such that the contact area between the radially inner surface of each magnet carrier and the rim is sufficient to avoid magnetic flux saturation therethrough.

11. A method of manufacturing a permanent magnet rotor comprising:
    manufacturing at least one magnet assembly; and
    mounting the at least one magnet assembly on a rotor rim,
        wherein manufacturing the at least one magnet assembly comprises:
            providing a magnet carrier comprising a channel having two sides;
            mounting permanent magnet material on the magnet carrier; and
            encircling the permanent magnet material and magnet carrier with a magnet retainer, and
    wherein:
        the magnet retainer passes through the channel such that the permanent magnet is retained on the magnet carrier;
        the channel is formed in a radially inner surface of the magnet carrier; and
        the permanent magnet is mounted on a radially outer surface of the magnet carrier.

12. The method of claim 11 wherein the permanent magnet material is unmagnetized when mounted to the magnet carrier.

13. The method of claim 12 further comprising magnetizing the permanent magnet material to create a permanent magnet after it has been mounted on the magnet carrier.

14. The method of claim 13 further comprising magnetizing the permanent magnet material to create a permanent magnet after the permanent magnet material and magnet carrier have been encircled with the magnet retainer.

15. The method of claim 11 wherein the magnet retainer comprises fibre filament.

16. The method of claim 15 wherein the magnet retainer further comprises an epoxy.

17. The method of claim 15 wherein the step of encircling the magnet and magnet carrier comprises winding the fibre around the magnet and magnet carrier.

18. The method of claim 11 wherein the step of mounting permanent magnet material on the magnet carrier includes bonding the permanent magnet material to the magnet carrier using adhesive.

* * * * *